(No Model.)
E. J. COLBY.
COFFEE POT.
No. 433,673. Patented Aug. 5, 1890.
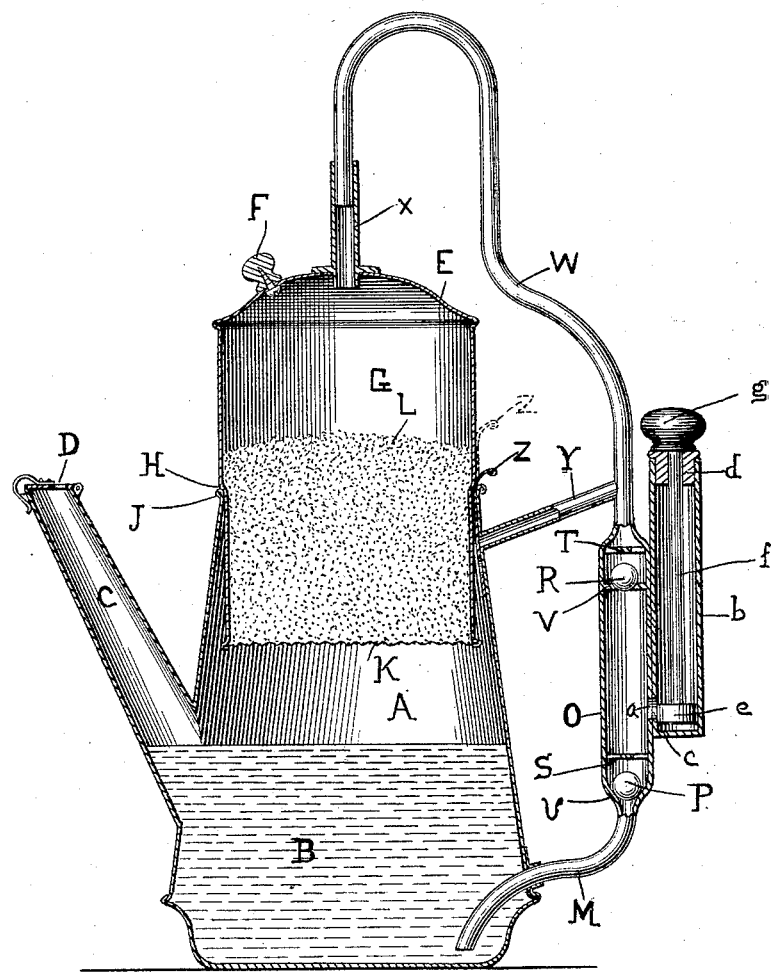
Witnesses:
Celeste P. Chapman.
Davida J. Johnson.
Inventor:
Edward J. Colby
By Francis W. Parker
Attorney.

UNITED STATES PATENT OFFICE.

EDWARD J. COLBY, OF CHICAGO, ILLINOIS.

COFFEE-POT.

SPECIFICATION forming part of Letters Patent No. 433,673, dated August 5, 1890.

Application filed November 11, 1889. Serial No. 329,839. (No model.)

*To all whom it may concern:*

Be it known that I, EDWARD J. COLBY, a citizen of the United States, residing at Chicago, in the county of Cook and State of Illinois, have invented a new and useful Coffee-Pot, of which the following is a specification.

My invention relates to culinary devices such as are particularly designed for making coffee, teas, extracts, and the like, and has for its object to provide convenient means therefor.

My invention is illustrated in the accompanying drawing, wherein—

A is the body of a coffee-pot; B, a quantity of water in the bottom thereof; C, the spout having the lid D; E, the top having the handle F, and G a movable upper portion shouldered at H to engage the bead J on the upper part of the pot A.

K is a sieve in the lower part of the portion G, which separates the chamber thereof from the chamber of the pot A.

L is a quantity of material, as, for instance, coffee.

M is a tube leading from the bottom of the chamber in the pot A to the cylinder O, containing the ball-valves P R with the stops S T and the valve-seats U V.

W is a tube leading from this cylinder to the sleeve X, adapted to enter the top E, and Y is a branch from the tube W, which leads into the top of the chamber in the pot A.

Z is a perforated slide to control the opening from such tube Y into such chamber.

$a$ is an aperture in the side cylinder O.

$b$ is a cylinder secured to the cylinder O and having an aperture $c$ to register with the aperture $a$. The cylinder $b$ has the head $d$, piston $e$, piston-rod $f$, and handle $g$ thereto attached, whereby the piston is reciprocated in the cylinder $b$. It will be readily seen that these parts could be greatly altered without departing from the spirit of my invention, and indeed I have adapted many different kinds and forms of pumps for the purpose of passing the water or steam or the fluid from the chamber in the pot A into the chamber in the portion G; but I consider the arrangement shown the best for either or both purposes.

The use and operation of my invention are as follows: For example, if it is to be used in making coffee, the coffee properly treated and in sufficient quantity is put into the chamber in the part G, resting upon the sieve K. This part is then inserted into the top of the chamber in the pot A, its shoulder H resting upon the bead J. The lid E is now put in position and the movable sleeve X brought down so as to make a continuous connection from the water B to the upper part of the chamber in the part G, and the slide Z is raised into the position shown in dotted lines, so as to make a continuous connection from the top chamber in the pot A to the upper part of the chamber in the portion G. The device is then subjected to a suitable degree of heat. The steam forming in the chamber in the pot A will to a certain degree pass upward into the coffee through the sieve K; but it will also pass through the pipe Y and W and the sleeve X into the upper portion of the chamber G. The pipe W and sleeve X will be made any dimensions, as also the upper part of the portion G, the object being to condense such steam and precipitate it upon the coffee L, thus forming the circulation through the same. If in the process of making coffee it is desired to pass the water B through the coffee it can be done by operating the piston $e$ by means of the handle $g$, which operates as an ordinary pump when raised, drawing the water in through the pipe M to fill the cylinder O, and when pressed down seating the valve upon the seat U and forcing the water up through the pipe W into the top of the chamber in the portion G. During this operation the slide Z must be down, as indicated in full lines. In this manner and by this means or by similarly-operating devices a continuous or intermittent, if desired, flow of steam or water can be had from the chamber below the substance being treated to the chamber above it, such flow being distributed in any desired manner.

Having thus described my invention, what I claim, and desire to secure by Letters Patent, is as follows:

1. In a culinary device, the combination of a fluid-chamber with a chamber to contain the substance to be treated, a connecting-pipe leading from the fluid-chamber to the other chamber on the opposite side of the substance to be treated, and a fluid-pump in such connecting-pipe.

2. In a culinary device, the combination of a fluid-chamber with a chamber to contain the substance to be treated, a connecting-pipe leading from the fluid-chamber to the other chamber on the opposite side of the substance to be treated and from beneath the normal surface of the fluid, and a second pipe leading from above the normal surface of the fluid in the fluid-chamber to the other chamber.

3. In a culinary device, the combination of a fluid-chamber with a chamber to contain the substance to be treated, a connecting-pipe leading from the fluid-chamber to the other chamber on the opposite side of the substance to be treated, a fluid-pump in such connecting-pipe, and a second pipe leading from the fluid-chamber to the other chamber, the last-mentioned pipe opening into the fluid-chamber above the normal surface of the fluid therein, and the pipe containing the pump leading from below the normal surface of the fluid therein.

4. In a culinary device, the combination of a fluid-chamber with a chamber to contain the substance to be treated, an exterior pipe connecting the two chambers, said pipe composed in part of a telescopic portion adapted to form a connection between the chamber containing the substance to be treated and the pipe.

5. In a culinary device, the combination of a fluid-chamber with a chamber adapted to contain the substance to be treated and two pipes leading from the fluid-chamber to the other chamber or one of them controlled by the valve.

EDWARD J. COLBY.

Witnesses:
 FRANCIS W. PARKER,
 CELESTE P. CHAPMAN.